US010275844B2

(12) United States Patent
Young et al.

(10) Patent No.: US 10,275,844 B2
(45) Date of Patent: Apr. 30, 2019

(54) HANDHELD PHOTO ENFORCEMENT SYSTEMS AND METHODS

(71) Applicant: AMERICAN TRAFFIC SOLUTIONS, INC., Mesa, AZ (US)

(72) Inventors: Kenneth M. Young, Gilbert, AZ (US); Scott C. Smith, Phoenix, AZ (US)

(73) Assignee: AMERICAN TRAFFIC SOLUTIONS, INC., Mesa, AZ (US)

( * ) Notice: Subject to any disclaimer, the term of this patent is extended or adjusted under 35 U.S.C. 154(b) by 0 days.

(21) Appl. No.: 15/976,284

(22) Filed: May 10, 2018

(65) Prior Publication Data

US 2018/0330460 A1 Nov. 15, 2018

Related U.S. Application Data

(60) Provisional application No. 62/504,457, filed on May 10, 2017.

(51) Int. Cl.
*G06Q 50/26* (2012.01)
*G08G 1/054* (2006.01)
*G06K 9/32* (2006.01)
*G08G 1/017* (2006.01)

(52) U.S. Cl.
CPC ........... *G06Q 50/265* (2013.01); *G06K 9/325* (2013.01); *G08G 1/0175* (2013.01); *G08G 1/054* (2013.01); *G06K 2209/01* (2013.01); *G06K 2209/15* (2013.01)

(58) Field of Classification Search
CPC ....... G06K 9/325; G08G 1/0175; G08G 1/054
See application file for complete search history.

(56) References Cited

U.S. PATENT DOCUMENTS

| 6,121,898 | A  | * | 9/2000  | Moetteli ............... G08G 1/052 340/905 |
| 6,188,329 | B1 |   | 2/2001  | Glier et al. |
| 6,690,294 | B1 | * | 2/2004  | Zierden ............... G08G 1/052 340/933 |
| 6,894,717 | B2 |   | 5/2005  | Bakewell |
| 7,262,790 | B2 |   | 8/2007  | Bakewell |
| 8,019,769 | B2 |   | 9/2011  | Rolle |
| 2002/0186297 | A1 |   | 12/2002 | Bakewell |
| 2003/0071730 | A1 | * | 4/2003  | Valbh .................... G07B 15/00 340/572.1 |
| 2003/0214585 | A1 |   | 11/2003 | Bakewell |
| 2008/0166023 | A1 | * | 7/2008  | Wang .................... G08G 1/054 382/107 |

(Continued)

FOREIGN PATENT DOCUMENTS

WO    2018209077 A1    11/2018

OTHER PUBLICATIONS

PCT/US2018/032055, International Search Report and Written Opinion, dated Aug. 22, 2018, 14 pages.

*Primary Examiner* — Edward Park
(74) *Attorney, Agent, or Firm* — Stoel Rives LLP

(57) ABSTRACT

A citation system may receive data, including an image, from a handheld photo enforcement unit and issue a citation based on the image with minimal officer input. The citation system manipulates photos to identify license plate numbers involved in an event. The citation system requests identification from a driver database, issues a citation, and forwards the citation according to information from the driver database.

18 Claims, 7 Drawing Sheets

(56) References Cited

U.S. PATENT DOCUMENTS

| | | |
|---|---|---|
| 2010/0128127 A1 | 5/2010 | Ciolli |
| 2012/0155712 A1* | 6/2012 | Paul .................. G06K 9/00 |
| | | 382/105 |
| 2012/0229304 A1 | 9/2012 | Dalal |
| 2012/0287278 A1 | 11/2012 | Danis |
| 2013/0215273 A1 | 8/2013 | Kareev et al. |
| 2014/0009320 A1 | 1/2014 | Tilton et al. |
| 2014/0355836 A1* | 12/2014 | Kozitsky ............ G06K 9/3258 |
| | | 382/105 |
| 2015/0246676 A1 | 9/2015 | Keren |
| 2016/0232785 A1 | 8/2016 | Wang |
| 2017/0140237 A1* | 5/2017 | Voeller ............... G06K 9/033 |
| 2017/0236019 A1* | 8/2017 | Watson .............. G06K 9/2018 |
| | | 382/105 |
| 2018/0137754 A1* | 5/2018 | Alon ................ G06K 9/00785 |

* cited by examiner

HANDHELD PHOTO ENFORCEMENT SYSTEMS AND METHODS

TECHNICAL FIELD

The present disclosure relates to traffic citation systems. Specifically, the present disclosure relates to traffic citations systems that interface with handheld photo enforcement units.

BRIEF DESCRIPTION OF THE DRAWINGS

The written disclosure herein describes illustrative embodiments that are non-limiting and non-exhaustive. Reference is made to certain of such illustrative embodiments that are depicted in the figures described below.

DETAILED DESCRIPTION

Figure 1:
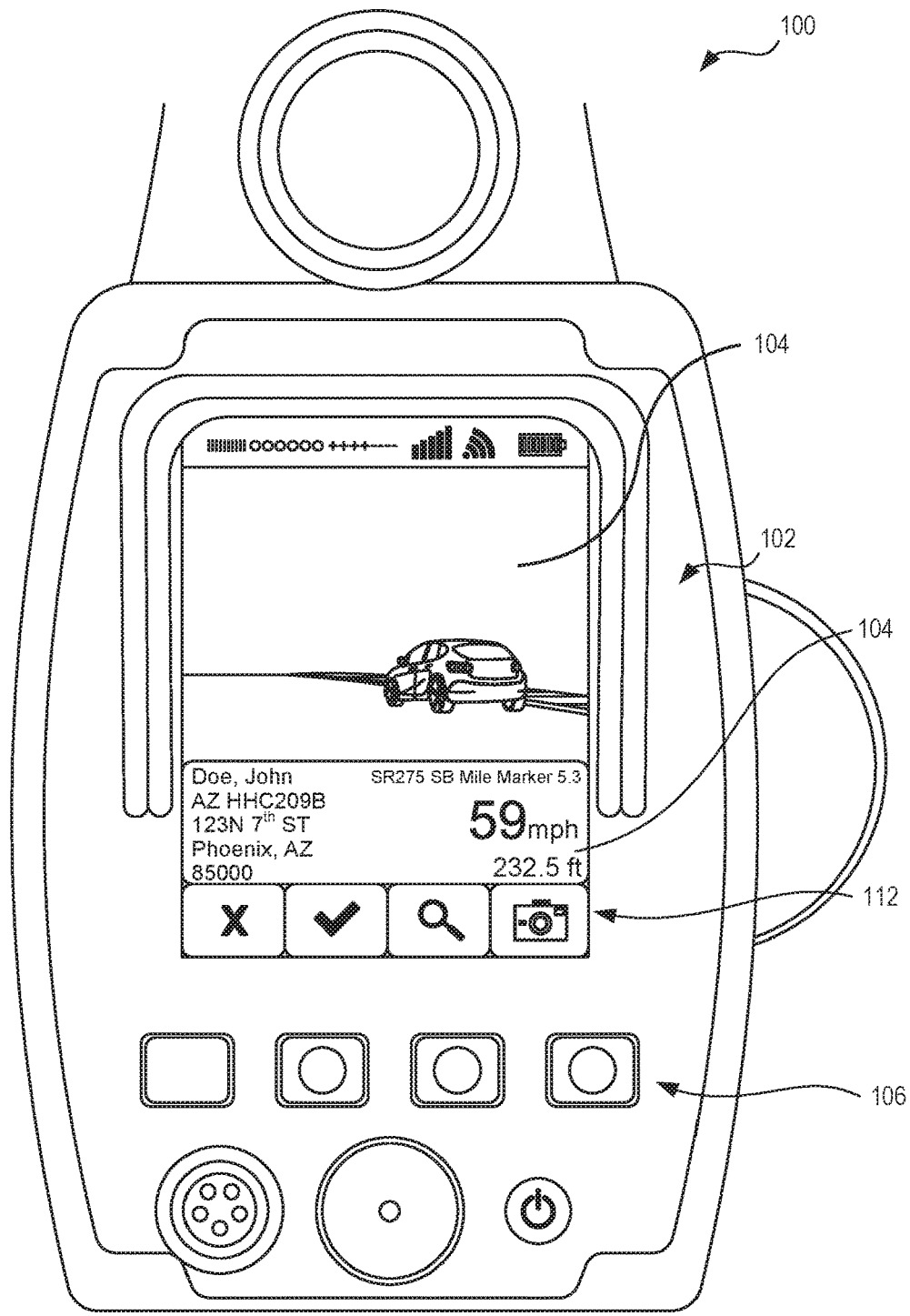
FIG. 1 illustrates a handheld photo enforcement unit, according to one embodiment.

This disclosure describes systems and methods for issuing citations. A citation system may receive data, including an image, from a handheld photo enforcement unit and issue a citation based on the image with minimal officer input. A handheld photo enforcement unit may include radar, light imaging detection and ranging (LIDAR), or another speed tracking device in combination with an image capture system. An officer or other user may use the handheld photo enforcement unit to capture a speed as well as an image of the vehicle. In some embodiments, the handheld photo enforcement unit may also measure the distance between two vehicles and the citation system may issue a tailgating violation. In some embodiments, the handheld photo enforcement unit may also be used to enforce a seatbelt or cell phone violations.

The handheld photo enforcement unit may communicate with the citation system via a network. For instance, the citation system may receive data from the handheld photo enforcement unit to identify a vehicle and a traffic event. For example, the data may include vehicle speed, an image capture, global positioning system (GPS) coordinates, video, a time stamp, and officer information. The citation system may provide the handheld photo enforcement unit with feedback based on the received data. For example, if the citation system fails to read a license plate based on the data provided, the citation system may request that an officer manually review the photo via the handheld photo enforcement unit. In some embodiments, the citation system may provide the feedback to another device such as a laptop, a cell phone, or another personal electronic device (PED). An officer may respond to the feedback from the citation system via the handheld photo enforcement unit or PED.

The citation system may also communicate with other systems and databases via a network. For example, the citation system may send and receive data to/from a DMV database. Similarly, in some embodiments, processor intensive tasks, such as image processing, may be handled by a remote server in communication with the citation system.

As used herein, the phrases "coupled to," "communicatively coupled to," and "in communication with" are broad enough to refer to any suitable coupling or other form of interaction between two or more components, including electrical, mechanical, fluid, and thermal interaction. Two components may be coupled to each other even though there may be intermediary devices between the two components.

Some of the infrastructure that can be used with embodiments disclosed herein is already available, such as: general-purpose computers, computer programming tools and techniques, digital storage media, and communications networks. A computer may include a processor, such as a microprocessor, a microcontroller, logic circuitry, or the like. The processor may include a special-purpose processing device, such as an ASIC, a PAL, a PLA, a PLD, an FPGA, or another customized or programmable device. The computer may also include a computer-readable storage device, such as non-volatile memory, static RAM, dynamic RAM, ROM, CD-ROM, disk, tape, magnetic memory, optical memory, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable transceivers, routers, hubs, switches, and/or other networking equipment. The network may include communications or networking software, such as software available from Novell, Microsoft, Artisoft, and other vendors, and may operate using UDP, TCP/IP, SPX, IPX, SONET, and other protocols over twisted pair, coaxial, or optical fiber cables; telephone lines; satellites; microwave relays; modulated AC power lines; physical media transfer; wireless radio links; and/or other data transmission "wires." The network may encompass smaller networks and/or be connectable to other networks through a gateway or similar mechanism.

Aspects of certain embodiments of a citation system may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc., that perform one or more tasks or implement particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. According to one embodiment, a database management system allows users to interact with one or more databases and provides access to the data contained in the databases.

In the following description, various aspects of the illustrative implementations will be described using terms commonly employed by those skilled in the art to convey the substance of their work to others skilled in the art. However, it will be apparent to those skilled in the art that the disclosure may be practiced with only some of the described aspects. For purposes of explanation, specific configurations are set forth in order to provide a thorough understanding of the illustrative implementations. However, it will be apparent to one skilled in the art that the disclosure may be practiced without the specific details. In other instances, well-known features are omitted or simplified in order not to obscure the illustrative implementations.

Various operations will be described as multiple discrete operations, in turn, in a manner that is most helpful in understanding the disclosure; however, the order of description should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 illustrates a handheld photo enforcement unit 100, according to one embodiment. The handheld photo enforcement unit 100 may comprise an image sensor, a speed detector, and a human machine interface (HMI) 102.

The image sensor may capture an image or a video of one or more vehicles. For instance, an officer may use the handheld photo enforcement unit 100 to measure the speed of a vehicle. During the process, the image sensor may capture one or more images of the vehicle. The images may be discarded if a license plate is not visible. If multiple images are captured, the handheld photo enforcement unit 100 may detect the clearest image and use that image for processing a citation. In some embodiments, the handheld photo enforcement unit 100 may request that the officer select one of the images. In some embodiments, the handheld photo enforcement unit 100 may select a frame from a video for processing the citation.

The speed detector may capture and track the speed of a vehicle. In some embodiments, the speed detector may use radar, LIDAR, or other speed detection systems. In some embodiments, the handheld photo enforcement unit 100 may also use a LIDAR system to measure a distance between cars to determine if a tailgating violation has occurred.

The HMI 102 may facilitate interaction between an officer and the handheld photo enforcement unit 100. The HMI 102 may include one or more input/output interfaces that facilitate human machine interaction. For example, the HMI 102 may include a screen 104 and a set of physical buttons 106. The screen 104 may display a live view from the image sensor and/or a previously captured image. An officer may depress one of the physical buttons 106 corresponding to image capture and the screen 104 may display a freeze frame of the captured image.

Another physical button 106 may send the captured image to a citation system via, for example, a network interface. The handheld photo enforcement unit 100 may receive data associated with the image from the citation system and display identification data on the screen 104. The identification data may include license plate state, license plate number, vehicle make, vehicle model, and the vehicle's registered owner name. Additional information may be captured and displayed by the handheld photo enforcement unit 100 including vehicle speed, GPS coordinates of the image capture, and distance between the handheld photo enforcement unit 100 and the vehicle. In some embodiments, the screen 104 may be a touchscreen and include virtual buttons 112. In addition, or in other embodiments, the physical buttons 106 may be programmable and the virtual buttons 112 may provide a description of the physical buttons 106.

The handheld photo enforcement unit 100 may also include a communication interface to relay captured image data and traffic event data. For example, the handheld photo enforcement unit 100 may use wireless communication protocols such as Wi-Fi or LTE to transmit captured image data and traffic event data to a citation system.

Figure 2:
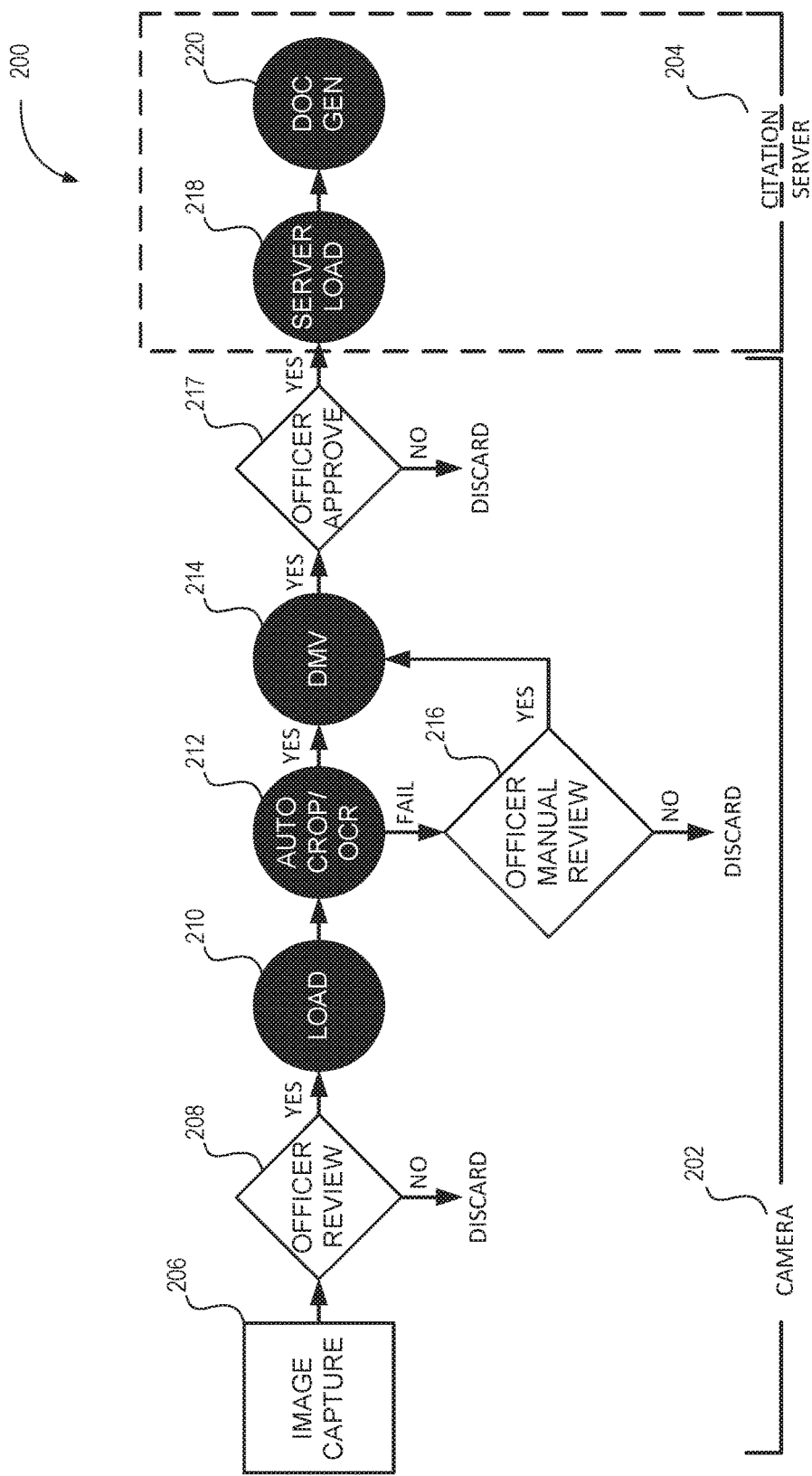
FIG. 2 is a flow chart of a method for processing a citation using a citation system, according to a first embodiment.

FIG. 2 is a flow chart of a method 200 for processing a citation using a citation system, according to a first embodiment. As shown, an officer may use a camera 202 in communication with a citation server 204 to identify a driver and issue a citation. The camera 202 may be, for example, the handheld photo enforcement unit 100 shown in FIG. 1 and described above.

A communication interface between the camera 202 and the citation server 204 may be direct or indirect. In certain embodiments, the camera 202 is in direct communication with the citation server 204, for example, through a wireless communication link such as a cellular communications link. In other embodiments, the camera 202 is provided with indirect communication with the citation server 204. For example, data may be transferred to/from the camera 202 through a laptop computer, mobile phone, memory card, etc. For instance, the camera 202 may capture the information, communicate with a laptop or a mobile phone via a Wi-Fi or Bluetooth connection then the laptop or a mobile phone can transmit the data to the citation server 204.

An officer may be deployed roadside and capture 206 an event with the camera 202. The officer may review 208 the event on the camera 202 and decide to proceed or reject the captured image. For example, the officer may decide to discard the image if it lacks sufficient clarity, or if the event did not constitute a violation. In some embodiments, the camera 202 may capture a video or multiple images. In some embodiments, the camera 202 may analyze the images or video frames to determine clarity and automatically present the most clear image with a license plate to the officer. In some embodiments, the camera 202 may present multiple images to the officer and the officer may select the image that he/she feels is the most clear.

If the officer elects to proceed with the citation process, the officer initiates loading 210 of the event and image into a citation service. In the example embodiment shown in FIG. 2, indicated portions of the citation service are performed by the camera 202. The citation service may perform actions to the event data to determine ownership and vehicle information of a vehicle in the image. The actions may include image identification, manipulation, and associating vehicle and ownership data with the image.

For example, as shown, the citation service may auto crop 212 the image of the event and use automatic license plate recognition (ALPR) or optical character recognition (OCR) to identify a license plate number. The citation service may communicate 214 with a department of motor vehicles (DMV) database and collect/edit data for submission. For example, the citation service may send the license plate number to the DMV database and receive owner information associated with the license plate number.

If the citation service fails to identify the license plate number, the service requests 216 officer manual review. The citation service may present the officer with a request 216 for manual review on the camera 202 or an auxiliary PED such as a laptop or cell phone. The officer reviews the failed capture and decides a submission step. For example, the officer may manually enter the license plate number if the officer can discern the number. The manually entry of the license plate number may be performed on the camera 202 or an auxiliary PED. The citation service may send this number to the DMV as described above. If the officer cannot discern the number, the image is discarded.

The citation service sends vehicle and owner information associated with the license plate number to the officer for approval. The citation service may present the vehicle and owner information on the camera 202 or an auxiliary PED. The officer does a final review 217 and decides to issue a citation or reject the event. The officer may enter his decision on an HMI associated with the camera 202 or the auxiliary PED. If the officer approves, the camera 202 or auxiliary PED forwards the event data to the citation server 204. The event data may include the image, speed, distance between cars, location of event, direction of travel, vehicle information, and owner information. The citation server 204 loads 218 the event data and issues a citation. The citation server 204 produces 220 citation documentation. The citation documentation may include a citation and an evidence package. The evidence package may include the image and ownership and vehicle information. The citation and evidence package may be forwarded to the violator. In some embodiments, the citation is forwarded to the violator and the evidence package is forwarded to a police database to store the evidence.

In certain embodiments, some or all of the officer review and/or input steps 208, 216, 217 are performed on the camera 202. In certain embodiments, at least one of the officer review and/or input steps 208, 216, 217 are performed on a user interface of an external device, such as a web browser of a laptop or mobile phone. For example, the officer review 208 of the image capture may occur on the camera 202, while the officer manual review 216 of the license plate and the final review 217 may occur on a user interface of a mobile phone.

Figure 3:
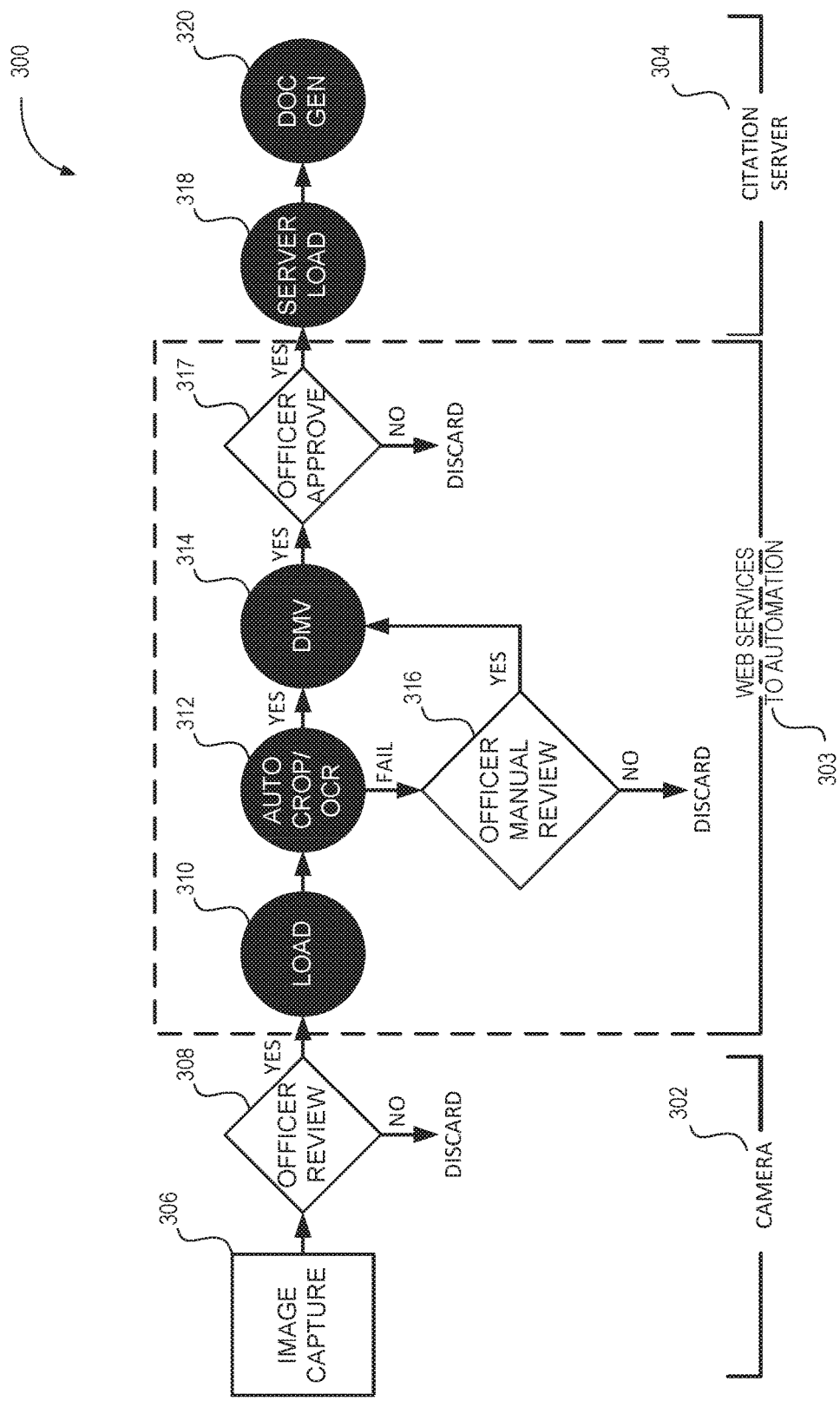
FIG. 3 is a flow chart of a method for processing a citation using a citation system, according to a second embodiment.

FIG. 3 is a flow chart of a method 300 for issuing a citation using a citation system, according to a second embodiment. As shown, image processing may be offloaded from a camera 302 to an automated web service 303 before a citation server 304 issues a citation. The camera 302 may include, for example, the handheld photo enforcement unit 100 shown in FIG. 1 and described above.

A communication interface between the camera 302 and the automated web service 303 may be direct or indirect. In certain embodiments, the camera 302 is in direct communication with the automated web service 303, for example, through a wireless communication link. In other embodiments, the camera 302 is provided with indirect communication with the automated web service 303. For example, data may be transferred to/from the camera 302 through a laptop computer, mobile phone, memory card, etc. For instance, the camera 302 may capture the information, communicate with a laptop or a mobile phone via a Wi-Fi or Bluetooth connection then the laptop or a mobile phone can transmit the data to the citation server 304.

The automated web service 303 may be performed on a server remote from the camera 302. In some embodiments, the server may combine both the automated web service 303 and the citation server 304. The automated web service 303 may interface with the camera 302, the citation server 304, and an auxiliary PED. The automated web service 303 may send requests for additional information or for approval to the officer through the auxiliary PED or the camera 302.

An officer may be deployed roadside and capture 306 an event with the camera 302. The officer may review 308 the event on the camera 302 and decide to proceed or reject the captured image. For instance, if the officer decides the image lacks sufficient clarity or if the event did not constitute a violation, the image may be discarded. In some embodiments, the camera 302 may capture a video or multiple images. In some embodiments, the camera 302 or the automated web service 303 may analyze the images or video frames to determine clarity and automatically present the most clear image with a license plate to the officer. In some embodiments, camera may present multiple images to the officer and the officer may select the image that he/she feels is the most clear.

If the officer elects to proceed, the officer initiates loading 310 of the event into the automated web service 303. The automated web service 303 may perform actions to the event data. This may include image identification, manipulation, and associating data with the image. For example, as shown, the automated web service 303 may auto crop 312 the image of the event and use OCR to identify a license plate number. The automated web service 303 may communicate 314 with a DMV and collect/edit data for submission. For example, the automated web service 303 may send the license plate number to the DMV and receive owner information associated with the license plate number.

If the automated web service 303 fails to identify the license plate number, the automated web service 303 requests 316 officer manual review. The officer reviews the failed capture and decides a submission step. For example, the officer may manually enter the license plate number if the officer can discern the number. This number is sent to the DMV as described above. If the officer cannot discern the number, the image is discarded.

The owner information associated with the license plate number is sent to the officer for approval. The officer does a final review 317 and decides to issue a citation or reject the event. If the officer approves, the citation server 304 loads 318 the event data and issues a citation. Citation documentation is produced 320 and forwarded to the violator and/or a police database.

In certain embodiments, the officer review and input 308 is performed on the camera 302, and one or both of the officer review and/or input steps 316, 317 are performed on a user interface of an external device, such as a web browser of a laptop or mobile phone. In other embodiments, each of the officer review and/or input steps 308, 316, 317 are performed through the camera 302.

Figure 4:
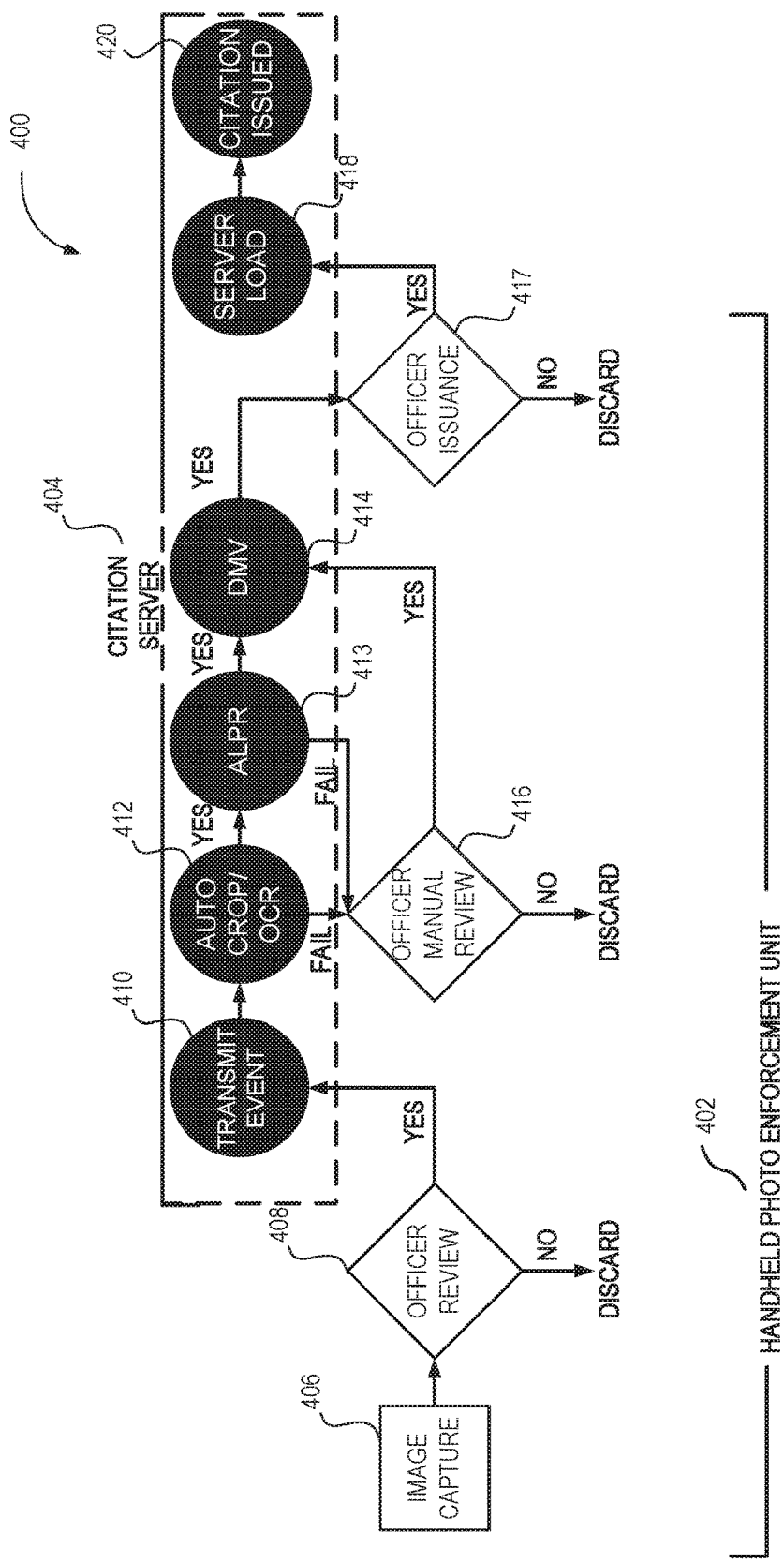
FIG. 4 is a flow chart of a method for processing a citation using a citation system, according to a third embodiment.

FIG. 4 is a flow chart of a method 400 for issuing a citation using a citation system, according to a third embodiment. As shown, an officer may use a handheld photo enforcement unit 402 in communication with a citation server 404 to identify a driver and issue a citation. The handheld photo enforcement unit 402 may include, for example, the handheld photo enforcement unit 100 shown in FIG. 1 and described above.

In certain embodiments, the handheld photo enforcement unit 402 is in direct communication with the citation server 404, for example, through a wireless communication link. In other embodiments, the handheld photo enforcement unit 402 is provided with indirect communication with the citation server 404. For example, data may be transferred to/from the handheld photo enforcement unit 402 through a laptop computer, mobile phone, memory card, etc. For instance, the handheld photo enforcement unit 402 may capture the information, communicate with a laptop or a mobile phone via a Wi-Fi or Bluetooth connection then the laptop or a mobile phone can transmit the data to the citation server 404.

An officer may be deployed roadside and capture 406 an event with the handheld photo enforcement unit 402. The officer may review 408 the event on the camera or on an auxiliary PED and decide to proceed or reject the captured image. For instance, if the officer decides the image lacks sufficient clarity or if the event did not constitute a violation, the event may be discarded. In some embodiments, the handheld photo enforcement unit 402 may determine to discard the image if the event does not constitute a violation. In some embodiments, the handheld photo enforcement unit 402 may capture a video or multiple images. In some embodiments, the handheld photo enforcement unit 402 may analyze the images or video frames to determine clarity and automatically present the most clear image with a license plate to the officer. In some embodiments, the handheld photo enforcement unit 402 may present multiple images to the officer and the officer may select the image that he/she feels is the most clear.

In certain embodiments, transmission 410 of event into service automatically occurs following positive officer review. As shown in FIG. 4, the service in this example embodiment is hosted by the citation server 404. The service may manipulate an image of the event to obtain a license plate number. For instance, the service may auto crop/identify 412 a location of region of interest (ROI) around the license plate. When the auto crop 412 is successfully completed, using ROI image as input, the service may translate 413 the license plate image into state and characters with a confidence for ALPR. If the confidence is above threshold the service may continue.

If the auto crop 412 or the translate 413 steps fail, the officer reviews 416 the failed capture and decides a next submission step. At this time the officer can either manually adjust ROI for the license plate and/or enter in the license plate individual characters for resubmission to the DMV. For example, the officer may manually enter the license plate number if the officer can discern the number. This number is sent to the DMV as described above. If the officer cannot discern the number, the image may be discarded.

The service may communicate 414 with a DMV and collect/edit data for submission back to the officer for review. For example, the service may send the license plate number to the DMV and receive owner information associated with the license plate number. The owner information associated with the license plate number is sent to the officer for approval.

The officer does a final review 417 and decides to issue a citation or reject the event. If the officer approves, the citation server 404 loads 418 the event data, assembles evidence package, and issues a citation. The evidence package may include the image of the license plate number, the location of the event, an image of the driver, and a LIDAR reading. A citation may be produced and mailed to the violator.

In certain embodiments, some or all of the officer review and/or input steps 408, 416, 417 are performed on the handheld photo enforcement unit 402. In certain embodiments, at least one of the officer review and/or input steps 408, 416, 417 are performed on a user interface of an external device, such as a web browser of a laptop or mobile phone.

In certain embodiments, a citation system may use data from a handheld photo enforcement unit to issue and forward a traffic citation in real time. A citation system may include a network interface and one or more processors. The network interface is for communication with a handheld photo enforcement unit. The one or more processors may manipulate the image and issue a citation based on the image. For example, the processor may auto crop an image around an ROI, the image being received from the handheld photo enforcement unit. The one or more processors may determine a license plate number using ALPR. The one or more processors may further issue, produce and forward a citation document to a traffic violator and/or a police database.

In certain embodiments, approvals and information received from an officer or another user may be provided for one or more of initial image, violation information (e.g., speed), processed image, extracted or user entered/corrected license plate number, and vehicle/owner information in real time, or very soon after the violation event, using the handheld photo enforcement unit. Thus, skilled users can make decisions based on current and/or recent events before memories of the event fade, which results in more accurate and reliable traffic violation enforcement.

Figure 5:
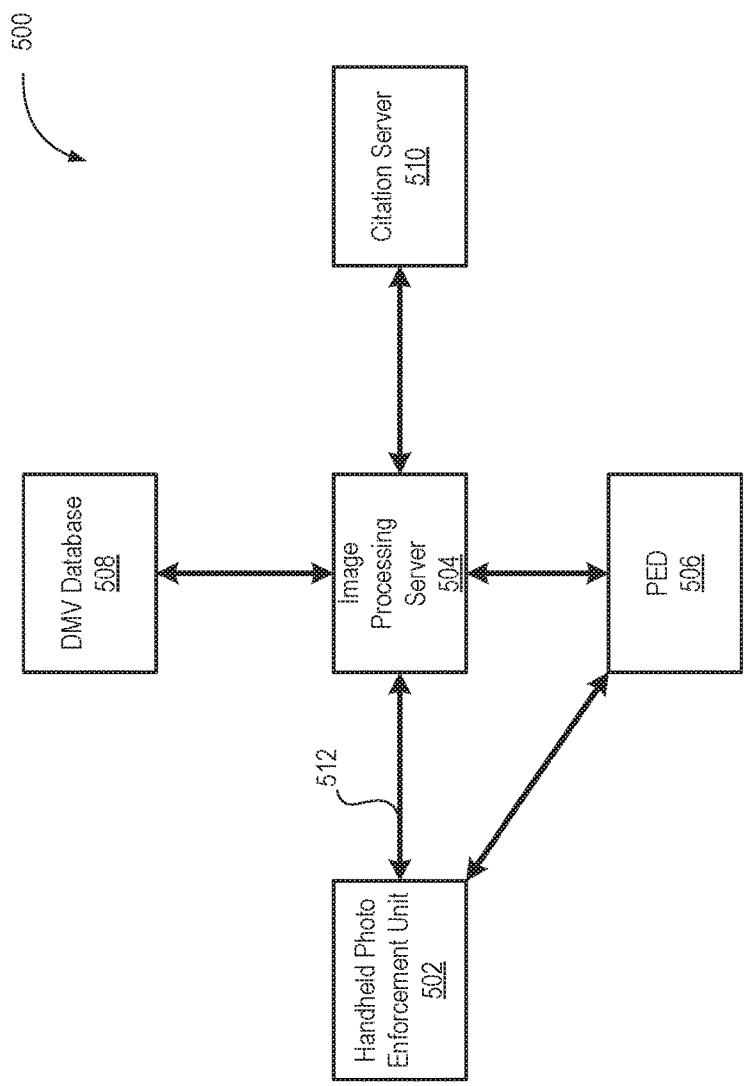
FIG. 5 Illustrates a block diagram of a citation system, according to one embodiment.

FIG. 5 Illustrates a block diagram of a citation system 500, according to one embodiment. The citation system 500 may generate a citation document and evidence package for a traffic event with limited officer involvement. The citation system 500 may include a handheld photo enforcement unit 502, an image processing server 504, and a citation server 510.

The handheld photo enforcement unit 502 may include a camera to capture image data from a traffic event. The handheld photo enforcement unit 502 may also include a speed detection unit such as a LIDAR sensor to measure the speed of a vehicle. The handheld photo enforcement unit 502 may also measure the distance between vehicles. In some embodiments, the handheld photo enforcement unit 502 may include an HMI to receive input from an officer indicating whether captured image data should be processed for a citation.

The handheld photo enforcement unit 502 may include a transmitter to wirelessly transmit the captured image data and associated vehicle speed and distance between vehicles. The transmitter may transmit using Wi-Fi, Bluetooth, or a cellular network protocol.

The handheld photo enforcement unit 502 may be in communication with the image processing server 504 through a first interface 512. The first interface 512 may be a direct interface as shown. In some embodiments, the handheld photo enforcement unit 502 may transmit the image data and the traffic event data to a remote device. For example, the handheld photo enforcement unit 502 may transmit the image data and the traffic event data to the image processing server 504. In some embodiments, the handheld photo enforcement unit 502 may transmit information to both a PED 506 and the image processing server 504.

In some embodiments, the first interface 512 may be an indirect interface. For example, the handheld photo enforcement unit 502 may transit the image data and the traffic event data to a local device that relays it to the Image processing server 504. For instance, the handheld photo enforcement unit 502 may transmit the information to the PED 506 that may transmit the information to a remote server such as the image processing server 504. In some embodiments, the PED 506 may receive input from an officer indicating whether captured image data should be processed for a citation.

The image processing server 504 may comprise a receiver to receive a wireless signal comprising the captured image data and associated vehicle speed and distance between vehicles from the handheld photo enforcement unit 502. The image processing server 504 may further comprise a processing unit to extract the captured image data and associated vehicle speed and distance between vehicles. The image processing server 504 may determine a license plate number within the captured image data by cropping the image around a license plate and using OCR and/or ADL.

The image processing server 504 may retrieve vehicle and owner information associated with the license plate number from a DMV database 508. For example, the image processing server 504 may transmit the license plate number and/or image to the DMV database and receive a response containing vehicle and owner information.

The image processing server 504 may also transmit a review request to the PED 506 to obtain approval to issue a citation for the traffic event. The approval may cause the image processing server 504 to transmit the image data, traffic event data, and the vehicle and owner information to the citation server 510. The citation server 510 may prepare a citation and an evidence package. The citation and evidence package may be sent to the vehicle owner and to a police database.

Figure 6:
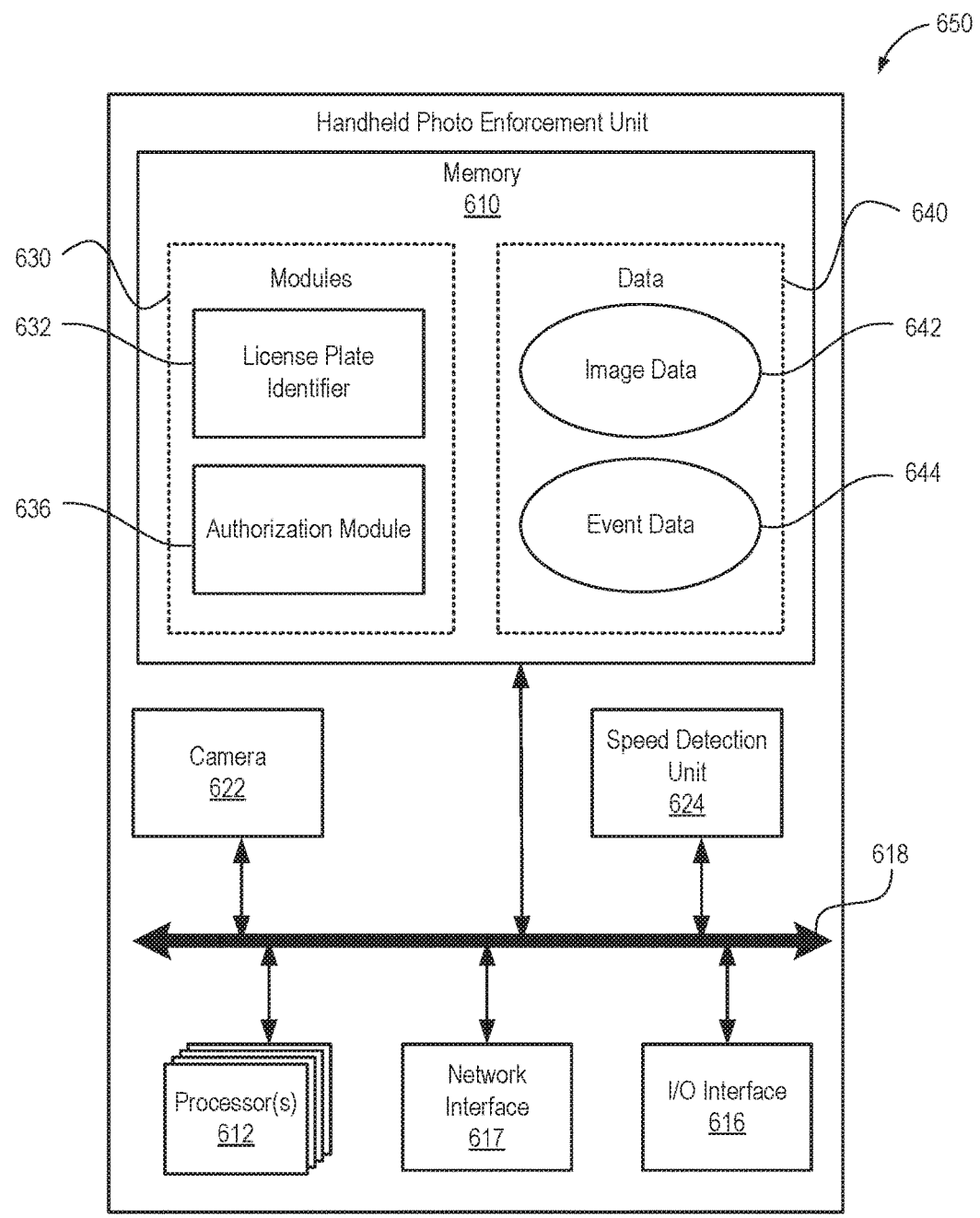
FIG. 6 is a block diagram of a processing circuit of a handheld photo enforcement unit, according to one embodiment.

FIG. 6 is a block diagram of a processing circuit of a handheld photo enforcement unit 650, according to one embodiment. The handheld photo enforcement unit 650 may include an electronic memory 610, one or more processors 612, a network interface 617 an I/O interface 616, a camera 622, and a speed detection unit 624.

The electronic memory 610 may include static RAM, dynamic RAM, flash memory, one or more flip-flops, or other electronic storage medium. The electronic memory 610 may include a plurality of modules 630 and data 640.

The modules 630 may include all or portions of other elements of the device. The modules 630 may run multiple operations serially, concurrently or in parallel by or on the one or more processors 612.

In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like.

In some embodiments, the modules 630 may include a license plate identifier 632 and an authorization module 636. The license plate identifier 632 may identify the license plate by cropping the image around a license plate and using OCR and/or ADL to identify the numbers. In some embodiments, the license plate identifier 632 may be offloaded to an image processing server (e.g., an image processing server 750 of FIG. 7). The authorization module 636 may present requests for authorization to process the image and send information to a citation server or an external PED using the network interface 617 or the I/O interface 616.

The data 640 stored on the electronic memory 610 may include the data 640 generated by the handheld photo enforcement unit 650, such as by the modules 630 or other modules. The data 640 stored may be organized as one or more memory registers/addresses, files, and/or databases. The data 640 may include image data 642 and event data 644. The image data 642 may include one or more images, or a video of a traffic event. The event data 644 may include the speed of a vehicle in the image, distance between vehicles, direction of travel, location, etc.

The I/O interface 616 and/or the network interface 617 may facilitate interfacing with one or more input devices and/or one or more output devices including an image processing server, an auxiliary PED, or a citation server.

A system bus 618 may facilitate communication and/or interaction between the other components of the processing circuitry, including the electronic memory 610, the one or more processors 612, the network interface 617, the I/O interface 616, the speed detection unit 624, and the camera 622.

The camera 622 may capture an image of a traffic event, and the speed detection unit 624 may capture traffic event details such as speed, distance between cars, current location, direction of travel, etc. As can be appreciated, in other embodiments, the processing circuitry may be simpler than shown or described. For example, certain designs may forgo one or more components, such as memory, multiple processors, multiple interfaces, and the like, and instead execute instructions closer to or on bare metal (e.g., without intervening operating system or other software layer, executing instructions directly on logic hardware).

Figure 7:
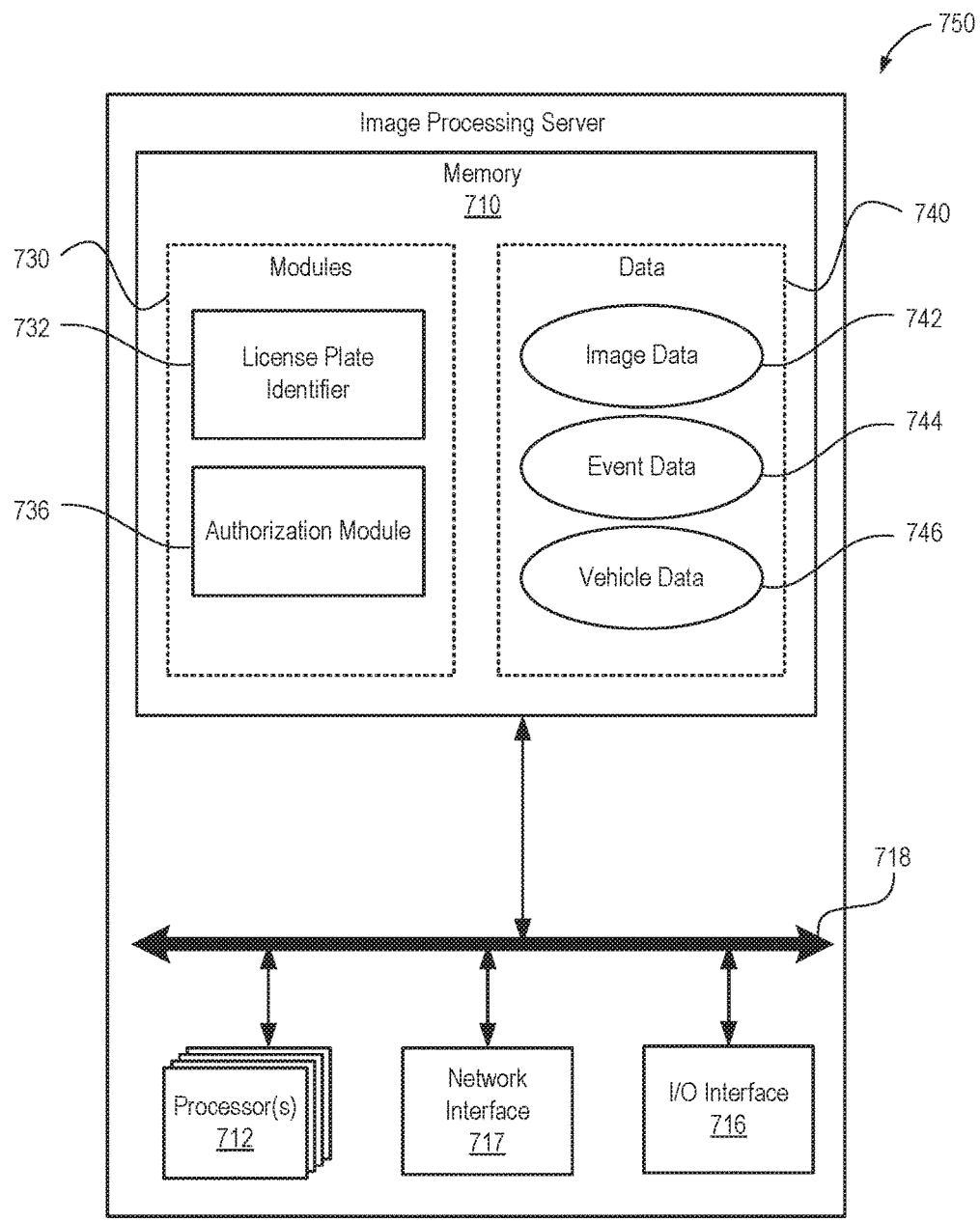
FIG. 7 is a block diagram of a processing circuit of an image processing server, according to one embodiment.

FIG. 7 is a block diagram of a processing circuit of an image processing server 750, according to one embodiment. The image processing server 750 may include an electronic memory 710, one or more processors 712, and a network interface 717 and an I/O interface 716.

The electronic memory 710 may include static RAM, dynamic RAM, flash memory, one or more flip-flops, or another electronic storage medium. The electronic memory 710 may include a plurality of modules 730 and data 740.

The modules 730 may include all or portions of other elements of the device. The modules 730 may run multiple operations serially, concurrently or in parallel by or on the one or more processors 712.

In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like.

In some embodiments, the modules 730 may include a license plate identifier 732 and an authorization module 736. The license plate identifier 732 may identify the license plate by cropping the image around a license plate and using OCR and/or ADL to identify the numbers. In some embodiments, the license plate identifier 732 may be offloaded to an image processing server (e.g., the image processing server 750). The authorization module 736 may present requests for authorization to process the image using the I/O interface 716, or an external PED connected through the network interface 717.

The data 740 stored on the electronic memory 710 may include the data 740 generated by a handheld photo enforcement unit or image processing server 750, such as by the modules 730 or other modules. The data 740 stored may be organized as one or more memory registers/addresses, files, and/or databases. The data 740 may include image data 742 and event data 744. The image data 742 may include one or more images, or a video of a traffic event. The event data 744 may include the speed of a vehicle in the image, distance between vehicles, direction of travel, location, etc. Vehicle data 746 may include vehicle and owner information associated with a vehicle in the image data from a DMV database.

The I/O interface 716 and/or the network interface 717 may facilitate interfacing with one or more input devices and/or one or more output devices. For example, the image processing server 750 may interface with a handheld photo enforcement unit to receive image and event data, an auxiliary PED to receive officer approval or manual input, a DMV database to retrieve vehicle and owner information, and a citation server to have a citation/ticket and evidence package prepared.

A system bus 718 may facilitate communication and/or interaction between the other components of the processing circuitry, including the electronic memory 710, the one or more processors 712, the network interface 717, and the I/O interface 716.

As can be appreciated, in other embodiments, the processing circuitry may be simpler than shown or described. For example, certain designs may forgo one or more components, such as memory, multiple processors, multiple interfaces, and the like, and instead execute instructions closer to or on bare metal (e.g., without intervening operating system or other software layer, executing instructions directly on logic hardware).

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic and/or processor executable instructions.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure includes all permutations of the independent claims with their dependent claims.

It will be understood by those having skill in the art that many changes may be made to the details of the above-described embodiments without departing from the underlying principles of the invention. The scope of the present invention should, therefore, be determined only by the following claims.

The invention claimed is:

1. A handheld photo enforcement unit, comprising:
   a camera to capture image data from a traffic event;
   a speed detector to determine a speed of a vehicle associated with the traffic event;
   a communication interface of the handheld photo enforcement unit configured to communicate with a department of motor vehicles database and a citation server; and
   a processor to:
   receive authorization from a user to process the image data;
   identify a license plate in the image data;
   attempt to determine a license plate number from the image data, if the attempt succeeds store the license plate number, if the attempt fails present a request to the user to review the image data and input the license plate number;
   retrieve vehicle and owner information from a database based on the license plate number;
   receive an input from the user to accept or reject the traffic event for issuing a citation using a citation process based on the retrieved vehicle and owner information;
   in response from the user to accept the traffic event, initiate the citation process to provide the citation server with the image data, the vehicle and owner information, the citation, and instructions to generate a citation document and an evidence package; and in response to the input from the user to reject the traffic event, discard the image data, the vehicle information, and the owner information from the citation process.

2. The handheld photo enforcement unit of claim 1, wherein to determine a license plate number, the processor uses automatic license plate recognition.

3. The handheld photo enforcement unit of claim 1, wherein to determine a license plate number, the processor uses optical character recognition.

4. The handheld photo enforcement unit of claim 1, wherein the processor is further to process a distance between a first vehicle and a second vehicle received from the speed detection unit.

5. The handheld photo enforcement unit of claim 1, further comprising a second communication interface between the camera, the speed detector and the processor.

6. The handheld photo enforcement unit of claim 5, wherein the processor is remote from the camera and the speed detector.

7. The handheld photo enforcement unit of claim 1, wherein the processor receives user authorizations from an auxiliary personal electronic device.

8. The handheld photo enforcement unit of claim 1, further comprising an input device to receive user authorizations.

9. The handheld photo enforcement unit of claim 1, wherein the processor is further to crop the image data around a region of interest including a license plate.

10. A non-transitory computer-readable storage medium that stores machine-readable instructions that, when executed by one or more processors of a traffic enforcement system, cause the one or more processors to perform operations comprising:

receive event data from a handheld photo enforcement unit, wherein the event data includes traffic violation data and an image of at least a portion of a vehicle;

determine a license plate number associated with the vehicle;

present a request to a user of the handheld photo enforcement unit to review the image data if the license plate is unable to be determined;

retrieve vehicle and owner information associated with the license plate number from a department of motor vehicles database;

present the event data, license plate number, and vehicle and owner information on a client device to the user for citation approval to accept or reject an event for issuing a citation using a citation process;

in response to receiving input representative of acceptance from the user, provide a citation server with image data, the vehicle and owner information, and the traffic violation data and instructions to generate a citation and an evidence package; and in response to receiving input representative of rejection from the user, discard the event data, license plate number, and vehicle and owner information from the citation process.

11. The non-transitory computer-readable storage medium of claim 10, wherein the event data from the handheld photo enforcement unit is received from a wireless signal.

12. The non-transitory computer-readable storage medium of claim 10, the operations further comprise:
present the event data to the user; and
receive authorization from the user to process event data.

13. The non-transitory computer-readable storage medium of claim 10, the operations further comprise:
present the image to the user if the license plate number cannot be determined; and
present a request that the user enter the license plate number manually.

14. The non-transitory computer-readable storage medium of claim 10, wherein the event data further includes distance between vehicles, location, and direction of travel.

15. The non-transitory computer-readable storage medium of claim 10, wherein the event data is presented to the user on a personal electronic device.

16. A traffic enforcement system, comprising:
a handheld photo enforcement unit comprising:
a camera to capture image data from a traffic event;
a light imaging detection and ranging sensor to measure the speed of a vehicle and the distance between vehicles;
a human machine interface to receive input from an a user indicating whether the captured image data should be processed for a citation; and
a transmitter to wirelessly transmit the captured image data and associated vehicle speed and distance between vehicles;
a citation server comprising:
a receiver to receive a wireless signal comprising the captured image data and associated vehicle speed and distance between vehicles from the handheld photo enforcement unit; and
a processor to:
extract the captured image data and associated vehicle speed and distance between vehicles;
determine a license plate number within the captured image data, wherein if the processor fails to determine a license plate number the processor transmits a first review request to a personal electronic device to review the image data;
retrieve vehicle and owner information associated with the license plate number from a department of motor vehicles database;
transmit a second review request to the personal electronic device to obtain approval to accept or reject the event for issuing a citation for the traffic event using a citation process; and
in response from the user to accept the traffic event, initiate the citation process to prepare a citation and an evidence package if an approval is obtained; and
in response to the input from the user to reject the traffic event, discard the image data, the vehicle and owner information from the citation process.

17. The traffic enforcement system of claim 16, where the processor of the citation server is further to forward the citation and the evidence package to a traffic violator based on the vehicle and owner information.

18. The traffic enforcement system of claim 16, further comprising a personal electronic device to display review requests and receive input from an user.

* * * * *